(12) United States Patent
Nagel et al.

(10) Patent No.: US 8,775,175 B1
(45) Date of Patent: Jul. 8, 2014

(54) PERFORMING DICTATION CORRECTION (71) Applicant: Google Inc., Mountain View, CA (US)

(72) Inventors: Jens Nagel, Sunnyvale, CA (US); Hugo B. Barra, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/847,053

(22) Filed: Mar. 19, 2013

Related U.S. Application Data (60) Provisional application No. 61/654,315, filed on Jun. 1, 2012.

(51) Int. Cl.
 *G10L 15/26* (2006.01)
 *G10L 15/00* (2013.01)
 *G10L 21/00* (2013.01)

(52) U.S. Cl.
 USPC .................. 704/235; 704/251; 704/270.1

(58) Field of Classification Search
 CPC ....... G10L 15/26; G10L 15/265; G10L 15/18; G10L 15/00; G10L 21/00; G06F 17/2765
 USPC ................ 704/235, 251, 257, 270, 270.1
 See application file for complete search history.

(56) References Cited

U.S. PATENT DOCUMENTS

| | | | |
|---|---|---|---|
| 5,909,667 A * | 6/1999 | Leontiades et al. | 704/275 |
| 6,195,637 B1 * | 2/2001 | Ballard et al. | 704/235 |
| 8,504,372 B2 * | 8/2013 | Carraux et al. | 704/270.1 |
| 2003/0200093 A1 * | 10/2003 | Lewis et al. | 704/260 |
| 2004/0006481 A1 * | 1/2004 | Kiecza et al. | 704/276 |
| 2005/0102140 A1 * | 5/2005 | Davne et al. | 704/235 |
| 2005/0203751 A1 * | 9/2005 | Stevens et al. | 704/276 |
| 2008/0319744 A1 * | 12/2008 | Goldberg | 704/235 |

* cited by examiner

*Primary Examiner* — Angela A Armstrong
(74) *Attorney, Agent, or Firm* — Fish & Richardson P.C.

(57) ABSTRACT

A method performed by one or more processing devices includes receiving data indicative of dictated speech that has been spoken by a user during speech dictation; causing speech recognition to be performed on the data to obtain units of text; selecting a unit from the units, wherein the unit selected corresponds to a portion of the data received at a time that is more recent relative to times at which others of the units are received; and generating, based on an output of the speech recognition, data for a graphical user interface, that when rendered on a display device, causes the graphical user interface to display: a visual representation of the dictated speech, wherein the visual representation includes a visual indicator of the unit selected; and a control for performing dictation correction on the unit selected in real-time during the speech dictation.

21 Claims, 4 Drawing Sheets

PERFORMING DICTATION CORRECTION

CLAIM OF PRIORITY

This application claims priority under 35 U.S.C. §119(e) to U.S. Provisional Patent Application No. 61/654,315, filed Jun. 1, 2012, the entire contents of which are hereby incorporated by reference.

BACKGROUND

Speech recognition converts spoken words into text. In an example, a user speaks a voice command into a microphone of a device (e.g., a mobile device). The device captures the voice command as an audio signal and transmits the audio signal to a speech recognition system. The speech recognition system converts the audio signal into a digital waveform using a Pulse Code Modulation technique. The speech recognition system converts the digital waveform into a set of discrete frequency bands using a Fast Fourier Transform technique.

The speech recognition system is configured to recognize the discrete frequency bands. In an example, the speech recognition system includes a database for storing data indicative of phonemes. In an example, a phoneme is a unit of speech in a language. The speech recognition system matches the discrete frequency bands to the phonemes in the database to covert the discrete frequency bands into text.

SUMMARY

In one aspect of the present disclosure, a method performed by one or more processing devices includes receiving data indicative of dictated speech that has been spoken by a user during speech dictation; causing speech recognition to be performed on the data to obtain units of text; selecting a unit from the units, wherein the unit selected corresponds to a portion of the data received at a time that is more recent relative to times at which others of the units are received; and generating, based on an output of the speech recognition, data for a graphical user interface, that when rendered on a display device, causes the graphical user interface to display: a visual representation of the dictated speech, wherein the visual representation includes a visual indicator of the unit selected; and a control for performing dictation correction on the unit selected in real-time during the speech dictation.

Implementations of the disclosure can include one or more of the following features. In some implementations, the method also includes receiving a selection of the control; and performing the dictation correction on the unit selected. In other implementations, the data received includes first data, the data generated includes second data, and the method further includes: receiving third data indicative of a progression of the dictation; and causing the speech recognition to be performed on the third data, during performance of the dictation correction.

In some implementations, the method includes generating fourth data for replacing, in the graphical user interface, the visual indicator of the unit selected with a visual representation of the third data. In other implementations, causing the speech recognition to be performed on the data includes: transmitting the data to a server device for performance of the speech recognition; and receiving, from the server device, text data indicative of a textual representation of the dictation; wherein the visual representation of the dictated speech includes a visual representation of the text data.

In still other implementations, the data received includes first data, the data generated includes second data, and the method further includes: prior to receiving the text data: generating third data for displaying in the graphical user interface a visual representation of a waveform of the dictation. In yet other implementations, the method includes following receipt of the text data: generating fourth data for replacing, in the graphical user interface, the visual representation of the waveform with the visual representation of the text data.

In still another aspect of the disclosure, one or more machine-readable media are configured to store instructions that are executable by one or more processing devices to perform operations including receiving data indicative of dictated speech that has been spoken by a user during speech dictation; causing speech recognition to be performed on the data to obtain units of text; selecting a unit from the units, wherein the unit selected corresponds to a portion of the data received at a time that is more recent relative to times at which others of the units are received; and generating, based on an output of the speech recognition, data for a graphical user interface, that when rendered on a display device, causes the graphical user interface to display: a visual representation of the dictated speech, wherein the visual representation includes a visual indicator of the unit selected; and a control for performing dictation correction on the unit selected in real-time during the speech dictation. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving data indicative of dictated speech that has been spoken by a user during speech dictation; causing speech recognition to be performed on the data to obtain units of text; selecting a unit from the units, wherein the unit selected corresponds to a portion of the data received at a time that is more recent relative to times at which others of the units are received; and generating, based on an output of the speech recognition, data for a graphical user interface, that when rendered on a display device, causes the graphical user interface to display: a visual representation of the dictated speech, wherein the visual representation includes a visual indicator of the unit selected; and a control for performing dictation correction on the unit selected in real-time during the speech dictation. Implementations of this aspect of the present disclosure san include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF DRAWINGS

Like reference symbols and designations in the various drawings indicate like elements.

DETAILED DESCRIPTION

A system consistent with this disclosure performs dictation correction, e.g., in real-time while a user of the system provides a dictation. Generally, a dictation includes one or more spoken words. Generally, dictation correction includes a modification to the dictation to address an error in the dictation. Generally, real-time includes a processing of information at a substantially same rate as the information is received.

In an example, the system provides the user with an application for dictation correction. In this example, the application generates data for a graphical user interface that renders a visual representation of a dictation. The graphical user interface includes a control for dictation correction. Through selection of the button, the user may instruct the application to delete a portion of the dictation. In this example, the user may select the button while the application is performing speech recognition and while the user provides the dictation. For example, the user does not have to stop dictating to correct an earlier part of a spoken sentence, word, and so forth.

Figure 1:
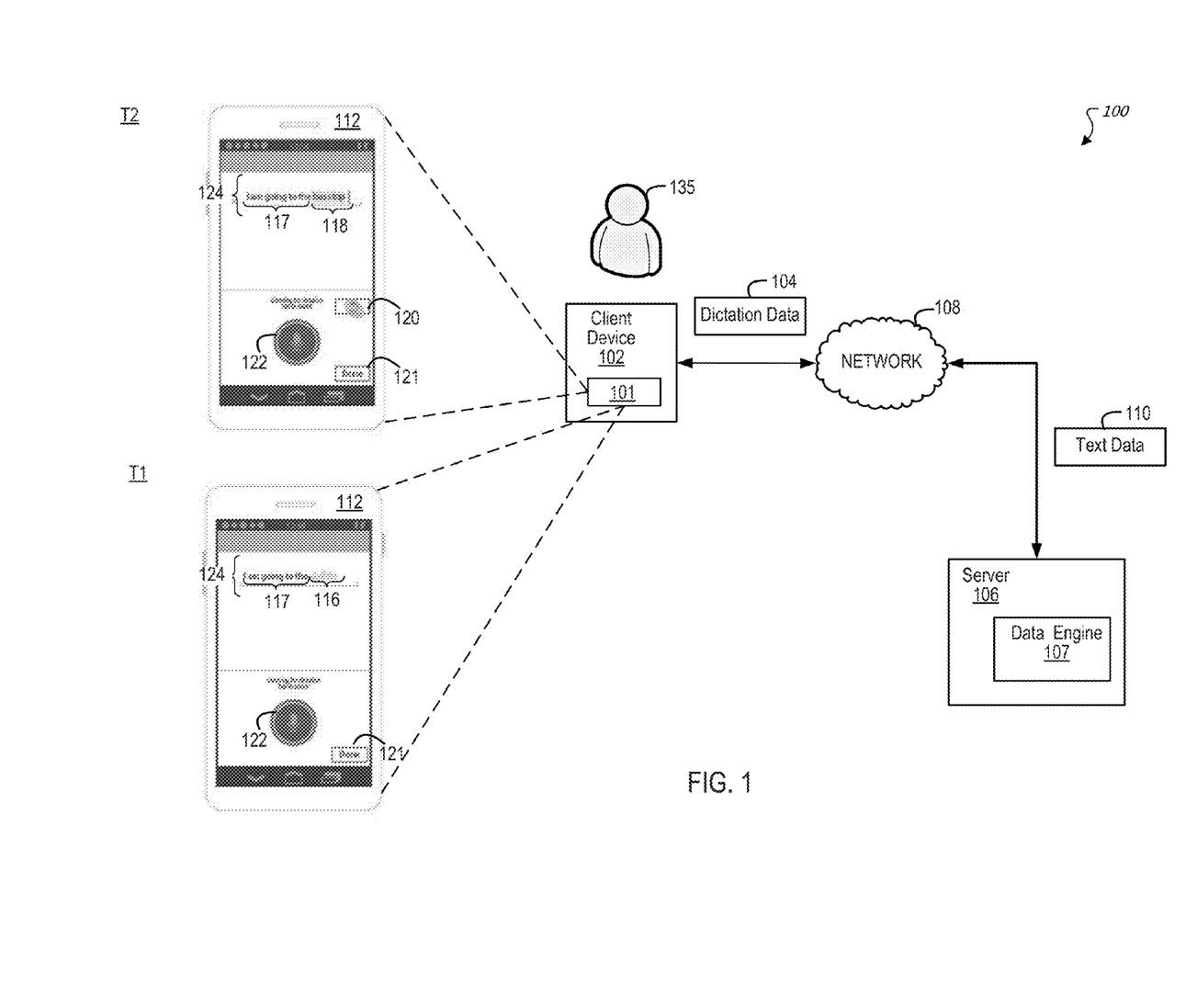
FIG. 1 is a diagram of an example of a network environment or performing dictation correction.

FIG. 1 is a diagram of an example of a network environment 100 for performing dictation correction. Network environment 100 includes client device 102, server 106, and network 108. Client device 102 can communicate with server 106 over network 108. Client device 102 is used by user 135. Network environment 100 may include many thousands of client devices and servers, which are not shown.

Server 106 includes data engine 107 for performing speech recognition. Although data engine 107 is shown as a single component in FIG. 1, data engine 107 can exist in one or more components, which can be distributed and coupled by network 108.

In an example, client device 102 includes application 101 for performance of dictation correction. In this example, application 101 generates data for graphical user interface 112 that is rendered by client device 102.

In the example of FIG. 1, graphical user interface 112 is shown at various times, including, e.g., times T1, T2. As described in further detail below, graphical user interface 112 displayed at time T1 includes data indicative of a dictation of user 135 at time T1. As user 135 continues to provide the dictation, graphical user interface 112 is updated with additional data indicative of the continued dictation. For example, the update to graphical user interface 112 may occur at time T2.

Graphical user interface 112 includes control 122 for starting a speech recognition mode. Graphical user interface 112 also includes control 121 for ending the speech recognition mode.

Through selection of control 122, user 135 instructs application 101 to enter into a speech recognition mode, in which application 101 listens for dictation data 104. Generally, dictation data 104 includes data indicative of a dictation spoken by user 135. In this example, user 135 provides the dictation by speaking words into a microphone (not shown) of client device 102. Application 101 receives signals indicative of the spoken words and transforms the signals into dictation data 104.

As described in further detail below, application 101 is configured to collect dictation data 104 and to transmit dictation data 104 to server 106 via network 108. In response to receipt of dictation data 104, data engine 107 performs speech recognition on the dictation data 104 to generate text data 110. Generally, text data 110 includes data indicative of a textual representation of a dictation. In the example of FIG. 1, application 101 generates visual representation 117 of text data. Graphical user interface 112 includes portion 124 for the display of visual representation 117 of text data 110.

In the example of FIG. 1, graphical user interface 112 includes control 120 for performance of dictation correction. Through control 120, user 135 may correct a portion of a dictation. In an example, user 135 may correct a portion of the dictation by deleting the portion of the dictation.

In an example, application 101 is configured to group portions (e.g., words) of the dictation in data chunks. Generally, a data chunk includes a unit of data. In this example, application 101 may be configured to capture a dictation as a series of data chunks. For example, dictation data 104 may be grouped into various data chunks. In an example, a data chunk may include a portion of dictation data 104 of a predefined length and/or size. In another example, a data chunk may include an amount of dictation data 104 occurring between pauses in speech.

In an example, dictation data 104 may include one data chunk (e.g., the words "bus stop." In another example, dictation data 104 may include numerous data chunks. In this example, control 120 may be used to perform dictation correction on a data chunk of dictation data 104 that has been received at a time that is more recent, e.g. relative to times at which other data chunks of dictation data 104 have been received (and/or relative to times at which other data chunks of previously spoken dictation data have been received). The data chunk that has been received at a time that is more recent, relative to times at which other data chunks have been received, corresponds to a portion of a dictation that has been spoken by user 135 more recently, e.g., relative to times at which other portions of the dictation have been spoken by user 135. In this example, user 135 may use control 120 to perform dictation correction, e.g., by deleting a data chunk of dictation data 104 that has been received at a time that is more recent, e.g., relative to times at which other data chunks of dictation data 104 have been received.

As a used continues to speak and the dictation progresses, contents of dictation data 104 may vary at various times, including, e.g., times T1, T2. In this example, at a time prior to time T1, contents of dictation data 104 may include data indicative of the words "I am at the." At time T1, contents of dictation data 104 may include data indicative of the words "bus stop." At time T2, contents of dictation data 104 may include data indicative of the words "coffee shop," as described in further detail below.

In this example, contents of text data 110 may also vary at various times, including, e.g., times T1, T2. In this example, at a time prior to time T1, contents of text data 110 may include data indicative of a textual representation of the words "I am at the." At time T1, contents of text data 110 may include data indicative of a textual representation of the words "bus stop." At time T2, contents of text data 110 may include data indicative of a textual representation of the words "coffee shop," as also described in further detail below.

In the example of FIG. 1, at a time prior to time T1, user 135 speaks the words "I am going to the." In this example, application 101 captures dictation data 104 for the words "I am going to the" and transmits the dictation data 104 to server 106. Server 106 performs speech recognition on dictation data 104. Through performance of the speech recognition, server 106 converts dictation data 104 into text data 110. Server 106 passes text data 110 back to client device 102, and application 101 updates graphical user interface 112 with visual representation 117 of text data 110.

At time T1, user 135 continues the dictation, e.g., by speaking the words "bus stop." In this example, application 101 captures the words "bus stop" as dictation data 104. Application 101 sends dictation data 104 to server 106 for speech recognition. While server 106 performs speech recognition, application 101 generates visual representation 116 of dictation data 104. Application 101 updates graphical user interface 112 with visual representation 116. In the example of FIG. 1, visual representation 116 includes a waveform representation of dictation data 104.

In an example, visual representation 116 is displayed to provide user 135 with confirmation that speech recognition is being performed on dictation data 104. Because speech recognition may require a few seconds to be performed, visual representation 116 provides user 135 with some immediate feedback, e.g., upon input of dictation data 104. That is, rather than user 135 speaking and application 101 providing user 135 with no information indicating that application 101 is processing dictation data 104, application 101 provides visual representation 116 to indicate that dictation data 104 is being processed. In this example, visual representation 116 may include a stock visual representation of a waveform, e.g., independent of contents of dictation data 104.

In an example, data engine 107 in server 106 performs speech recognition on dictation data 104 to generate text data 110. In this example, text data 110 includes the words "bus stop." Server 106 sends text data 110 to client device 102.

At time T2, application 101 receives text data 110 and updates portion 124 of graphical user interface 112 with visual representation 118 of text data 110. In visual representation 118, the words "bus stop" are highlighted, e.g., to visually indicate that these words may be deleted through selection of control 120. In this example, the words "bus stop" include a data chunk that has been received at a time that is more recent, e.g., relative to times at which other data chunks in dictation data 104 have been received.

In the example of FIG. 1, user 135 selects control 120 to delete visual representation 118 of the words "bus stop." In this example, as user 135 selects control 120, user 135 also continues dictating, e.g., by speaking in a microphone of client device 102. In this example, application 101 performs dictation correction while user 135 continues with a dictation.

Following selection of control 120, application 101 performs dictation correction on dictation 104. At a substantially same time, application 101 continues performance of speech recognition, e.g., as user 135 continues dictation. In this example, application 101 generates dictation data 104 from the words "coffee shop" and sends the dictation data 104 for the words "coffee shop" to server 106 for performance of speech recognition.

In this example, application 101 receives from server 106 text data 110 for the words "coffee shop." Application 101 updates graphical user interface 110 with a visual representation (not shown) of text data 110 for the words coffee shop, e.g., following deletion of visual representation 118. In this example, application 101 is configured to replace visual representation 118 with the visual representation (not shown) of text data 110 for the words "coffee shop," e.g., without user 135 having to stop and/or pause the dictation. In this example, dictation correction occurs while user 135 continues with the dictation.

In another example, control 120 may be used to repeatedly perform dictation correction, e.g., by repeatedly deleting data chunks. In this example, user 135 selects control 120 to delete the data chunk represented by visual representation 118. Following deletion of the data chunk represented by visual representation 118, application 101 may be configured to highlight a previously spoken data chunk, e.g., to indicate that the previously spoken data chunk may be deleted through control 120.

Figure 2:
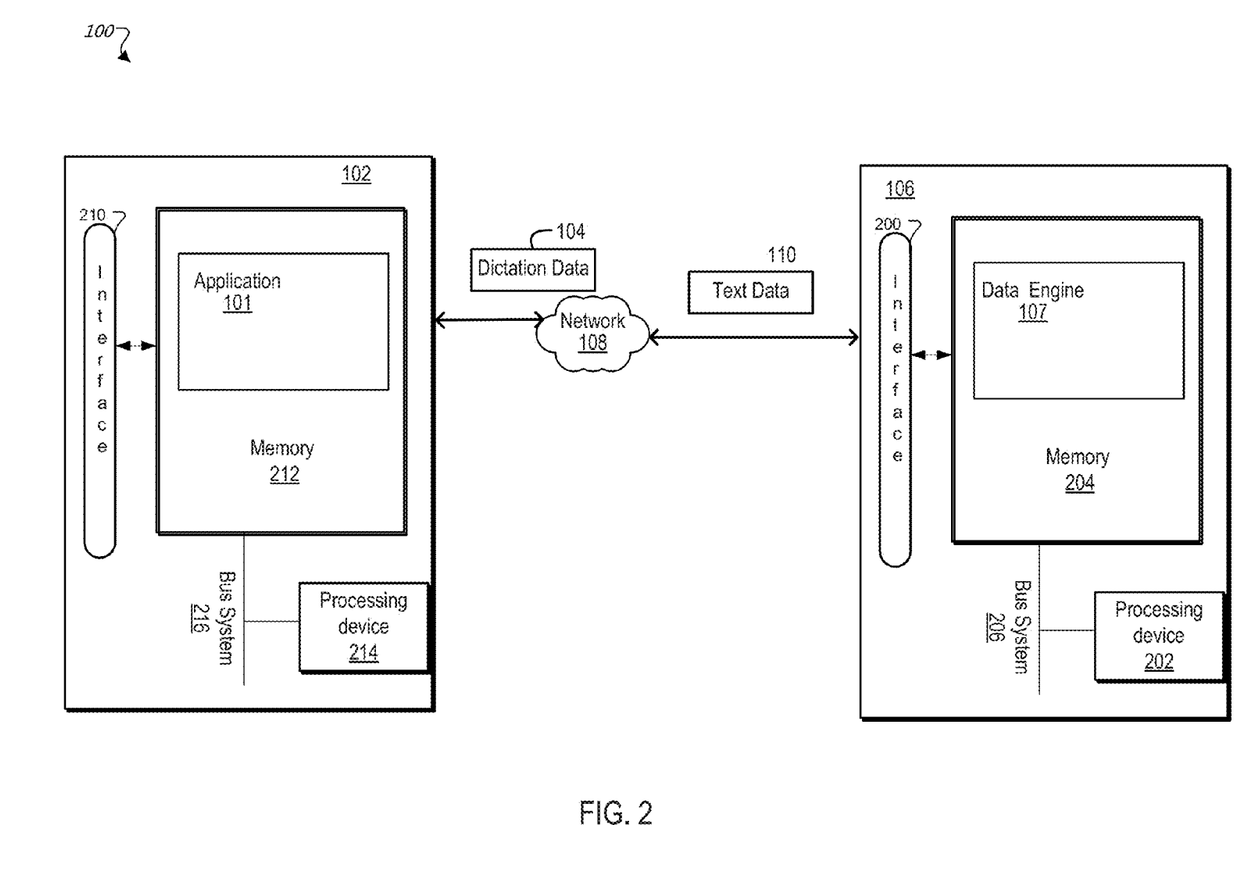
FIG. 2 is a block diagram showing examples of components of a network environment for performing dictation correction.

FIG. 2 is a block diagram showing examples of components of network environment 100 for performing dictation correction. In the example of FIG. 2, graphical user interface 112, contents of graphical user interface 112, and user 135 are not shown.

Client device 102 can be a computing device capable of taking input from a user and communicating over network 108 with server 106 and/or with other computing devices. For example, client device 102 can be a mobile device, a desktop computer, a laptop, a cell phone, a personal digital assistant (PDA), a server, an embedded computing system, a mobile device, and the like. Network environment 100 can include a plurality of computing devices, which can be geographically dispersed.

Network 108 can include a large computer network, including, e.g., a local area network (LAN), wide area network (WAN), the Internet, a cellular network, or a combination thereof connecting a number of mobile computing devices, fixed computing devices, and server systems. The network(s) may provide for communications under various modes or protocols, including, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (CPRS), among others. Communication may occur through a radio-frequency transceiver. In addition, short-range communication may occur, including, e.g., using a Bluetooth, WiFi, or other such transceiver.

Server 106 can be a variety of computing devices capable of receiving data and running one or more services, which can be accessed by client device 102. In an example, server 106 can include a server, a distributed computing system, a desktop computer, a laptop, a cell phone, a rack-mounted server, and the like. Server 106 can be a single server or a group of servers that are at a same location or at different locations. Client device 102 and server 106 can run programs having a client-server relationship to each other. Although distinct modules are shown in the figures, in some examples, client and server programs can run on the same device.

Server 106 can receive data from client device 102 through input/output (I/O) interface 200. I/O interface 200 can be a type of interface capable of receiving data over a network, including, e.g., an Ethernet interface, a wireless networking interface, a fiber-optic networking interface, a modem, and the like. Server 106 also includes a processing device 202 and memory 204. A bus system 206, including, for example, a data bus and a motherboard, can be used to establish and to control data communication between the components of server 106.

Processing device 202 can include one or more microprocessors. Generally, processing device 202 can include an appropriate processor and/or logic that is capable of receiving and storing data, and of communicating over a network (not shown). Memory 204 can include a hard drive and a random access memory storage device, including, e.g., a dynamic random access memory, or other types of non-transitory machine-readable storage devices. As shown in FIG. 2, memory 204 stores computer programs that are executable by processing device 202. These computer programs include data engine 107. Data engine 107 can be implemented in software running on a computer device (e.g., server 106), hardware or a combination of software and hardware.

Client device 102 can receive data from server 106 through I/O interface 210. Client device 102 also includes a processing device 214 and memory 212. A bus system 216, including, for example, a data bus and a motherboard, can be used to establish and to control data communication between the components of client device 102. As shown in FIG. 2, memory 212 stores computer programs that are executable by processing device 214. These computer programs include application 101.

Figure 3:
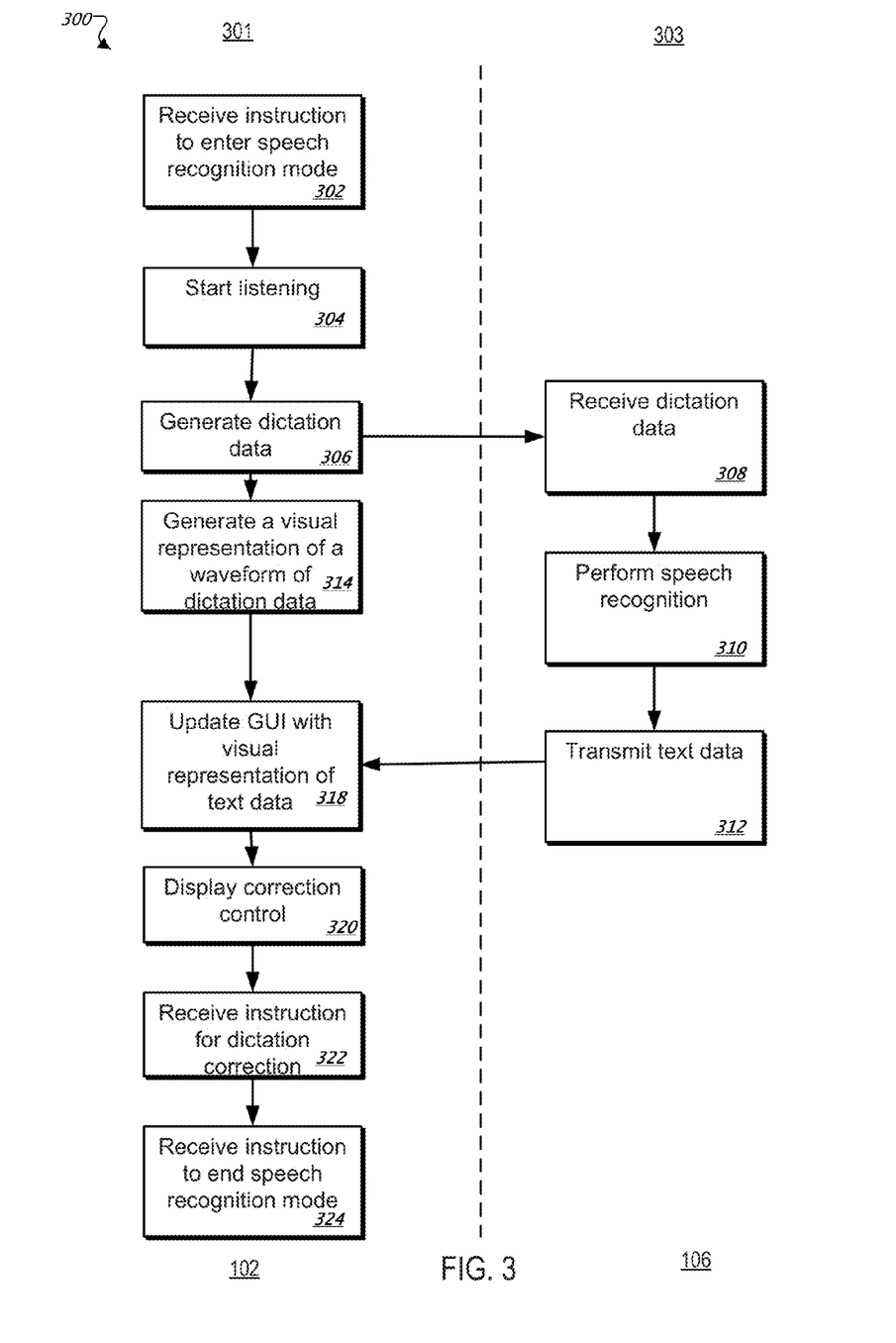
FIG. 3 is a flow chart of an example process for performing dictation is correction.

FIG. 3 is a flow chart of an example process 300 for performing dictation correction. In FIG. 3, process 300 is split into a left part 301 and a right part 303. The left part 301 may be performed on client device 102 (and/or by application 101 running on client device 102). The right part 303 may be performed on server 106.

In operation, application 101 receives (302) an instruction to enter into a speech recognition mode. As previously described, application 101 may be configured to render graphical user interface 112 on client device 102. In this example, graphical user interface 112 includes control 122. Through selection of control 122, user 135 instructs application 101 to enter into a speech recognition mode.

In response to receipt of the instruction, application 101 listens (304) for dictation data 104 that is input by user 135 into a microphone (not shown) of client device 102. In this example, user 135 dictates by speaking words into the microphone. Application 101 receives signals indicative of the spoken words and generates (306) dictation data 104 from the received signals.

In the example of FIG. 3, client device 102 transmits (not shown) dictation data 104 to server 106, e.g., for server 106 to perform speech recognition on dictation data 104. Server 106 receives (308) dictation data 104 and performs speech recognition on dictation data 104. While server 106 performs speech recognition on dictation data 104, application 101 generates (314) a visual representation 116 of a waveform of dictation data 104.

In an example, referring back to FIG. 1, at a time prior to time T1, user 135 speaks the words "I am going to the." In this example, graphical user interface 112 includes visual representation 117 of the words "I am going to the." At time T1, user 135 continues dictating by speaking the words "bus stop." Ire this example, while data engine 107 is performing speech recognition on dictation data 104 for the words "bus stop," application 101 updates graphical user interface 112 with visual representation 116 of a waveform of dictation data 104.

Still referring to FIG. 3, data engine 107 in server 106 performs (310) speech recognition on dictation data 104 to generate text data 110. Server transmits (312) text data 110 to client device 102. In response to receipt of text data 110, application 101 updates (318) graphical user interface 112 with visual representation 118 of text data 110, e.g., at time T2 as shown in the example of FIG. 1.

Application 101 also displays (320) in graphical user interface 112 control 120 for performance of dictation correction. Through selection of control 120, user 135 may correct a portion of a dictation. Following selection of control 120, application 101 receives (322) an instruction to perform dictation correction on dictation data 104. In this example, application 101 performs dictation correction by deleting dictation data 104, e.g., by removing visual representation 118 of dictation data 104 from portion 124 of graphical user interface 112. In this example, application 101 also receives (324) an instruction to end speech recognition mode, e.g., following selection of control 121 (FIG. 1).

Using the techniques described herein, a system in configured to perform dictation correction, e.g., in real-time and as a user of the system provides a dictation.

Figure 4:
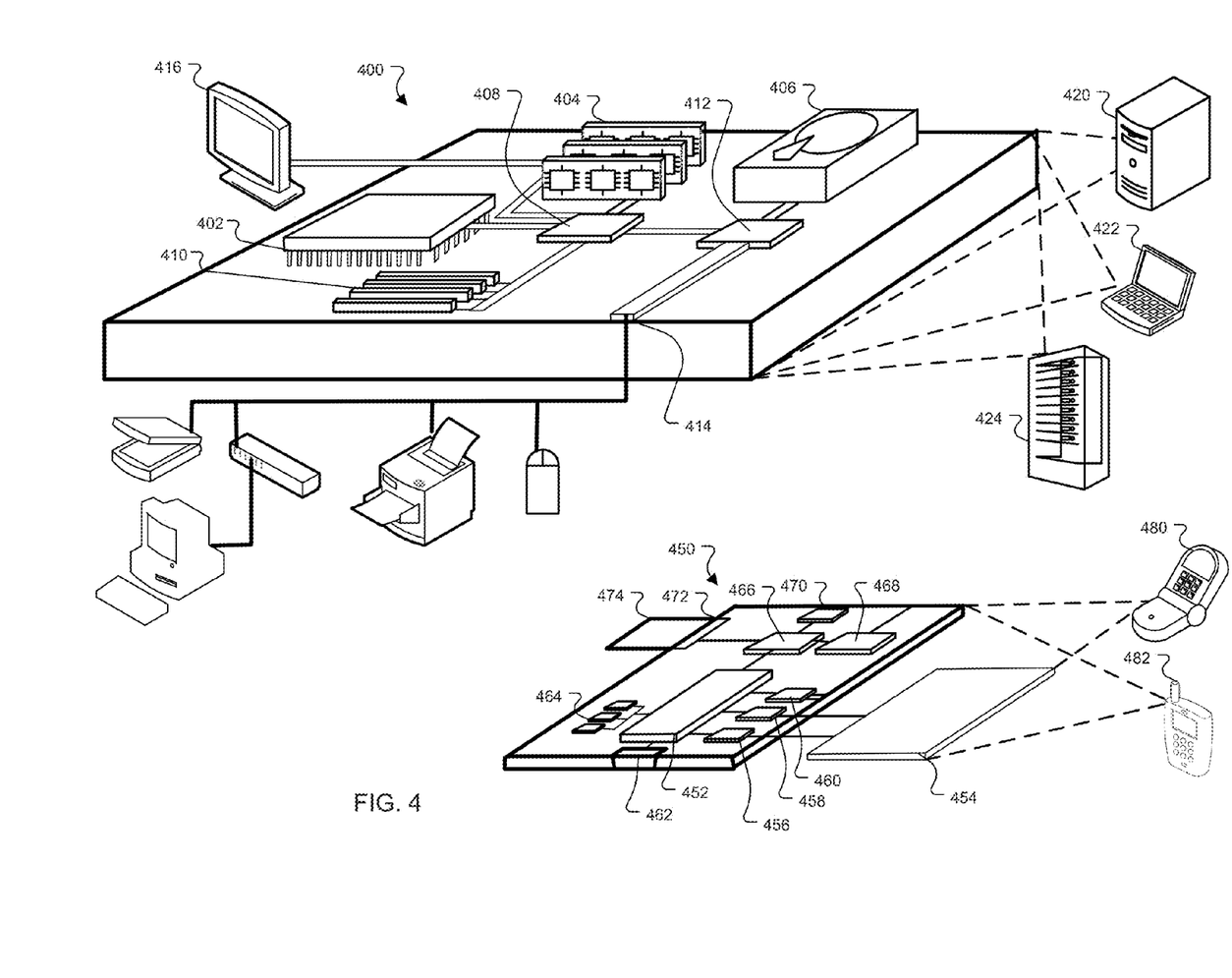
FIG. 4 shows an example of a computer device and a mobile computer device that can be used to implement the techniques described herein.

FIG. 4 shows an example of computer device 400 and mobile computer device 450, which can be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes processor 402, memory 404, storage device 406, high-speed interface 408 connecting to memory 404 and high-speed expansion ports 410, and low speed interface 412 connecting to low speed bus 414 and storage device 406. Each of components 402, 404, 406, 408, 410, and 412, are interconnected using various busses, and can be mounted on a common motherboard or in other manners as appropriate. Processor 402 can process instructions for execution within computing device 400, including instructions stored in memory 404 or on storage device 406 to display graphical data for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

Memory 404 stores data within computing device 400. In one implementation, memory 404 is a volatile memory unit or units. In another implementation, memory 404 is a non-volatile memory unit or units, Memory 404 also can be another form of computer-readable medium, such as a magnetic or optical disk.

Storage device 406 is capable of providing mass storage for computing device 400. In one implementation, storage device 406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, such as those described above. The data carrier is a computer- or machine-readable medium, such as memory 404, storage device 406, memory on processor 402, and the like.

High-speed controller 408 manages bandwidth-intensive operations for computing device 400, while low speed controller 412 manages lower bandwidth-intensive operations. Such allocation of functions is an example only. In one implementation, high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth®, Ethernet, wireless Ethernet), can be coupled to one or more input/output devices, such as is a keyboard, a pointing device, a scanner, or a networking device such as a switch or router, e.g., through a network adapter.

Computing device 400 can be implemented in a number of different forms, as shown in the figure. For example, it can be implemented as standard server 420, or multiple times in a group of such servers. It also can be implemented as part of rack server system 424. In addition or as an alternative, it can be implemented in a personal computer such as laptop computer 422. In some examples, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes processor 452, memory 464, an input/output device such as display 454, communication interface 466, and transceiver 468, among other components, Device 450 also can be provided with a storage device, such as a microdrive or other device, to provide additional storage. Each of components 450, 452, 464, 454, 466, and 468, are interconnected using various buses, and several of the components can be mounted on a common motherboard or in other manners as appropriate.

Processor 452 can execute instructions within computing device 450, including instructions stored in memory 464. The processor can be implemented as a chipset of chips that include separate and multiple analog and digital processors. The processor can provide, for example, for coordination of the other components of device 450, such as control of user interfaces, applications run by device 450, and wireless communication by device 450.

Processor 452 can communicate with a user through control interface 458 and display interface 456 coupled to display 454, Display 454 can be, for example, a TFT LCD (Thin-Film-Transistor Liquid Crystal Display) or an OLED (Organic Light Emitting Diode) display, or other appropriate display technology. Display interface 456 can comprise appropriate circuitry for driving display 454 to present graphical and other data to a user. Control interface 458 can receive commands from a user and convert them for submission to processor 452. In addition, external interface 462 can communicate with processor 442, so as to enable near area communication of device 450 with other devices, External interface 462 can provide, for example, for wired communication in some implementations, or for wireless communication in other implementations, and multiple interfaces also can be used.

Memory 464 stores data within computing device 450, Memory 464 can be implemented as one or more of a computer-readable medium or media, a volatile memory unit or units, or a non-volatile memory unit or units. Expansion memory 474 also can be provided and connected to device 450 through expansion interface 472, which can include, for example, a SIMM (Single In Line Memory Module) card interface. Such expansion memory 474 can provide extra storage space for device 450, or also can store applications or other data for device 450. Specifically, expansion memory 474 can include instructions to carry out or supplement the processes described above, and can include secure data is also. Thus, for example, expansion memory 474 can be provide as a security module for device 450, and can be programmed with instructions that permit secure use of device 450. In addition, secure applications can be provided via the SIMM cards, along with additional data, such as placing identifying data on the SIMM card in a non-hackable manner.

The memory can include, for example, flash memory and/or NVRAM memory, as discussed below. In one implementation, a computer program product is tangibly embodied in an data carrier. The computer program product contains instructions that, when executed, perform one or more methods, such as those described above. The data carrier is a computer- or machine-readable medium, such as memory 464, expansion memory 474, and/or memory on processor 452, that can be received, for example, over transceiver 468 or external interface 462.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, COMA, TDMA, PDC, WCDMA, CDMA2000, or GPRS, among others. Such communication can occur, for example, through radio-frequency transceiver 468. In addition, short-range communication can occur, such as using a Bluetooth®, WiFi, or other such transceiver (not shown). In addition, GPS (Global Positioning System) receiver module 470 can provide additional navigation- and location-related wireless data to device 450, which can be used as appropriate by applications running on device 450.

Device 450 also can communicate audibly using audio codec 460, which can receive spoken data from a user and convert it to usable digital data. Audio codec 460 can likewise generate audible sound for a user, such as through a speaker, e.g., in a handset of device 450. Such sound can include sound from voice telephone calls, can include recorded sound (e.g., voice messages, music files, and the like) and also can include sound generated by applications operating on device 450.

Computing device 450 can be implemented in a number of different forms, as shown in the figure. For example, it can be implemented as cellular telephone 480. It also can be implemented as part of smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that Information into a social graph.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method comprising:
   receiving, from a client device associated with a user, data indicative of dictated speech that has been spoken by the user during speech dictation;
   causing speech recognition to be performed on the data to obtain units of text;
   automatically selecting, by one or more processing devices in real-time and during the speech dictation, a recently dictated unit from the units, wherein the recently dictated unit corresponds to a portion of the data received at a time that is more recent relative to times at which others of the units are received; and
   generating, during speech recognition, data for a graphical user interface, that when rendered on a display device of the client device associated with the user, causes the graphical user interface to display:
      a visual representation of the dictated speech;
      a visual indicator of the recently dictated unit, with the visual indicator being displayed within the visual representation of the dictated speech; and
      a control for performing dictation correction on the recently dictated unit in real-time during the speech dictation.

2. The method of claim 1, further comprising:
   receiving a selection of the control; and
   performing the dictation correction on the recently dictated unit.

3. The method of claim 2, wherein the data received comprises first data, the data generated comprises second data, and wherein the method further comprises:
   receiving third data indicative of a progression of the dictation; and
   causing the speech recognition to be performed on the third data, during performance of the dictation correction.

4. The method of claim 3, further comprising:
   generating fourth data for replacing, in the graphical user interface, the visual indicator of the recently dictated unit with a visual representation of the third data.

5. The method of claim 1, wherein causing the speech recognition to be performed on the data received comprises:
   transmitting the data received to a server device for performance of the speech recognition; and
   receiving, from the server device, text data indicative of a textual representation of the dictation;
   wherein the visual representation of the dictated speech comprises a visual representation of the text data.

6. The method of claim 5, wherein the data received comprises first data, the data generated comprises second data, and wherein the method further comprises:
   prior to receiving the text data:
      generating third data for displaying in the graphical user interface a visual representation of a waveform of the dictation.

7. The method of claim 6, further comprising:
   following receipt of the text data:
      generating fourth data for replacing, in the graphical user interface, the visual representation of the waveform with the visual representation of the text data.

8. One or more machine-readable hardware storage devices storing instructions that are executable by one or more processing devices to perform operations comprising:
   receiving, from a client device associated with a user, data indicative of dictated speech that has been spoken by the user during speech dictation;
   causing speech recognition to be performed on the data to obtain units of text;
   automatically selecting, in real-time and during the speech dictation, a recently dictated unit from the units, wherein the recently dictated unit corresponds to a portion of the data received at a time that is more recent relative to times at which others of the units are received; and
   generating, during speech recognition, data for a graphical user interface, that when rendered on a display device of the client device associated with the user, causes the graphical user interface to display:
  a visual representation of the dictated speech;
  a visual indicator of the recently dictated unit, with the visual indicator being displayed within the visual representation of the dictated speech; and
  a control for performing dictation correction on the recently dictated unit in real-time during the speech dictation.

9. The one or more machine-readable hardware storage devices of claim 8, wherein the operations further comprise:
  receiving a selection of the control; and
  performing the dictation correction on the recently dictated unit.

10. The one or more machine-readable hardware storage devices of claim 9, wherein the data received comprises first data, the data generated comprises second data, and wherein the operations further comprise:
  receiving third data indicative of a progression of the dictation; and
  causing the speech recognition to be performed on the third data, during performance of the dictation correction.

11. The one or more machine-readable hardware storage devices of claim 10, wherein the operations further comprise:
  generating fourth data for replacing, in the graphical user interface, the visual indicator of the recently dictated unit with a visual representation of the third data.

12. The one or more machine-readable hardware storage devices of claim 8, wherein causing the speech recognition to be performed on the data received comprises:
  transmitting the data received to a server device for performance of the speech recognition; and
  receiving, from the server device, text data indicative of a textual representation of the dictation;
  wherein the visual representation of the dictated speech comprises a visual representation of the text data.

13. The one or more machine-readable hardware storage devices of claim 12, wherein the data received comprises first data, the data generated comprises second data, and wherein the operations further comprise:
  prior to receiving the text data:
    generating third data for displaying in the graphical user interface a visual representation of a waveform of the dictation.

14. The one or more machine-readable hardware storage devices of claim 13, wherein the operations further comprise:
  following receipt of the text data:
    generating fourth data for replacing, in the graphical user interface, the visual representation of the waveform with the visual representation of the text data.

15. An electronic system comprising:
  one or more processing devices; and
  one or more machine-readable hardware storage devices storing instructions that are executable by the one or more processing devices to perform operations comprising:
    receiving, from a client device associated with a user, data indicative of dictated speech that has been spoken by the user during speech dictation;
    causing speech recognition to be performed on the data to obtain units of text;
    automatically selecting, in real-time and during the speech dictation, a recently dictated unit from the units, wherein the recently dictated unit corresponds to a portion of the data received at a time that is more recent relative to times at which others of the units are received; and
    generating, during speech recognition, data for a graphical user interface, that when rendered on a display device of the client device associated with the user, causes the graphical user interface to display:
      a visual representation of the dictated speech;
      a visual indicator of the recently dictated unit, with the visual indicator being displayed within the visual representation of the dictated speech; and
      a control for performing dictation correction on the recently dictated unit in real-time during the speech dictation.

16. The electronic system of claim 15, wherein the operations further comprise:
  receiving a selection of the control; and
  performing the dictation correction on the recently dictated unit.

17. The electronic system of claim 16, wherein the data received comprises first data, the data generated comprises second data, and wherein the operations further comprise:
  receiving third data indicative of a progression of the dictation; and
  causing the speech recognition to be performed on the third data, during performance of the dictation correction.

18. The electronic system of claim 17, wherein the operations further comprise:
  generating fourth data for replacing, in the graphical user interface, the visual indicator of the recently dictated unit with a visual representation of the third data.

19. The electronic system of claim 15, wherein causing the speech recognition to be performed on the data received comprises:
  transmitting the data received to a server device for performance of the speech recognition; and
  receiving, from the server device, text data indicative of a textual representation of the dictation;
  wherein the visual representation of the dictated speech comprises a visual representation of the text data.

20. The electronic system of claim 19, wherein the data received comprises first data, the data generated comprises second data, and wherein the operations further comprise:
  prior to receiving the text data:
    generating third data for displaying in the graphical user interface a visual representation of a waveform of the dictation.

21. The electronic system of claim 20, wherein the operations further comprise:
  following receipt of the text data:
    generating fourth data for replacing, in the graphical user interface, the visual representation of the waveform with the visual representation of the text data.

* * * * *